United States Patent [19]

Püntener et al.

[11] Patent Number: 4,962,191
[45] Date of Patent: Oct. 9, 1990

[54] 1:2 CHROMIUM OR COBALT COMPLEX AXO DYES CONTAINING AT LEAST ONE 2-ARYL-4-AMINO-6-HYDROXYPYRIMIDINE RADICAL

[75] Inventors: Alois Püntener, Rheinfelden; Kurt Burdeska, Basel, both of Switzerland

[73] Assignee: Ciba-Geigy Corporation, Ardsley, N.Y.

[21] Appl. No.: 399,202

[22] Filed: Aug. 28, 1989

[30] Foreign Application Priority Data

Aug. 31, 1988 [CH] Switzerland .................. 3238/88

[51] Int. Cl.$^5$ .................. C09B 45/48; C09B 45/00; D06P 1/39; D06P 3/32
[52] U.S. Cl. .................. 534/698; 534/697; 534/707; 534/712; 534/775; 534/781; 534/791; 534/582; 534/602; 544/319; 544/326
[58] Field of Search .................. 534/697, 698, 707, 711, 534/775, 781, 791, 712

[56] References Cited

U.S. PATENT DOCUMENTS

| 1,606,209 | 11/1926 | Montmollin et al. | 534/791 X |
| 3,481,918 | 12/1969 | Straley et al. | 534/775 X |
| 3,492,287 | 1/1970 | Wunderlich et al. | 534/791 X |
| 3,939,140 | 2/1976 | Meininger et al. | 534/697 X |
| 3,970,615 | 7/1976 | Schütz et al. | 534/697 |

FOREIGN PATENT DOCUMENTS

| 68242 | 1/1983 | European Pat. Off. | 534/697 |
| 1085987 | 7/1960 | Fed. Rep. of Germany | 534/707 |
| 2202820 | 7/1973 | Fed. Rep. of Germany | 534/791 |
| 2611826 | 9/1976 | Fed. Rep. of Germany | 534/707 |
| 1060797 | 3/1967 | United Kingdom | 534/781 |
| 1330277 | 9/1973 | United Kingdom | 534/697 |

OTHER PUBLICATIONS

Oostveen et al., Chemical Abstracts, vol. 87, No. 184449d (1977).
Poli, Chemical Abstracts, vol. 93, No. 186398j (1980).
F. Yoneda et al., J. Chem. Soc. Perkin I, 1547-1550 (1976).

Primary Examiner—Floyd D. Higel
Assistant Examiner—Fiona T. Powers
Attorney, Agent, or Firm—Kevin T. Mansfield; George R. Dohmann

[57] ABSTRACT

Dyes suitable for dyeing a wide range of textile and non-textile materials, in particular for dyeing leather and pelts, having, in the form of the free acid, the formula

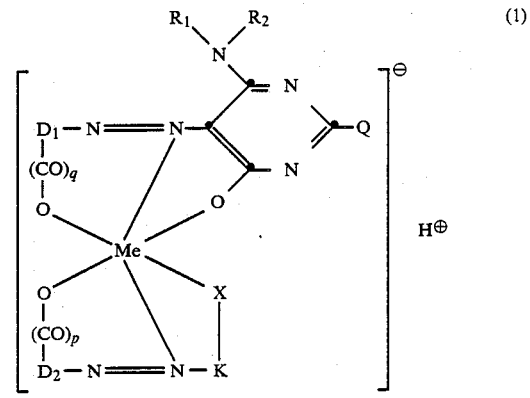

wherein
$D_1$ and $D_2$ are each independently of the other the radical of a diazo component of the benzene or naphthalene series which carries a hydroxy or carboxy in ortho-position to the azo group and which may or may not be further substituted,
K is the radical of a coupling component of the benzene or naphthalene series or of the heterocyclic series which carries the group X in ortho-position to the azo group and which may or may not be further substituted,
Me is chromium or cobalt,
Q is an unsubstituted or substituted phenyl or naphthyl radical or an unsubstituted or substituted aromatic-heterocyclic radical,
$R_1$ is unsubstituted or substituted $C_1$-$C_6$alkyl or unsubstituted or substituted phenyl,
$R_2$ is hydrogen or independently has the meaning of $R_1$,
X is —O— or —$NR_3$,
$R_3$ is hydrogen or $C_1$-$C_4$alkyl, and
p and q are each independently of the other 0 or 1.

15 Claims, No Drawings

1:2 CHROMIUM OR COBALT COMPLEX AXO DYES CONTAINING AT LEAST ONE 2-ARYL-4-AMINO-6-HYDROXYPYRIMIDINE RADICAL

The present invention relates to novel metal complex compounds, to their preparation and to the use thereof for dyeing a wide range of textile and non-textile materials, especially leather.

Specifically, the invention relates to metal complex compounds which, in the form of the free acid, have the formula

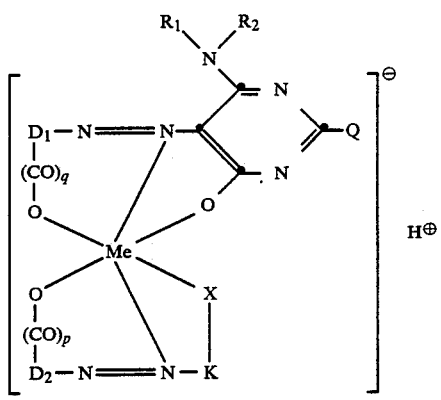

wherein $D_1$ and $D_2$ are each independently of the other the radical of a diazo component of the benzene or naphthalene series which carries a hydroxy or carboxy group in ortho-position to the azo group and which may or may not be further substituted, K is the radical of a coupling component of the benzene or naphthalene series or of the heterocyclic series which carries the group X in ortho-position to the azo group and which may or may not be further substituted, Me is chromium or cobalt, Q is an unsubstituted or substituted phenyl or naphthyl radical or an unsubstituted or substituted aromatic-heterocyclic radical, $R_1$ is unsubstituted or substituted $C_1$-$C_6$alkyl or unsubstituted or substituted phenyl, $R_2$ is hydrogen or independently has the meaning of $R_1$, X is —O— or —$NR_3$—, $R_3$ is hydrogen or $C_1$-$C_4$alkyl, and p and q are each independently of the other 0 or 1.

The diazo radicals $D_1$ and $D_2$ are derived, for example, from a 1- or 2-naphthylamine or aminobenzene, which aromatic amines each carry a hydroxy or carboxy group in ortho-position to the amino group and may in addition be further substituted by one or more identical or different radicals.

Examples of suitable substituents of the phenyl or naphthyl radicals $D_1$ and $D_2$ are: $C_1$-$C_4$alkyl, which throughout this specification will be generally understood as comprising methyl, ethyl, n-propyl or isopropyl or n-, iso-, sec- or tert-butyl; $C_1$-$C_4$alkoxy, which will be generally be understood as meaning methoxy, ethoxy, n-propoxy or isopropoxy, or n-, iso-, sec- or tert-butoxy; halogen, which will be generally understood as meaning fluoro, bromo and, preferably, chloro; trifluoromethyl; $C_1$-$C_4$alkylsulfonyl, preferably methylsulfonyl or ethylsulfonyl; sulfamoyl; N-mono- or N,N-dialkylsulfamoyl, the alkyl moiety or moieties containing 1 to 4 carbon atoms; carbamoyl; N-mono- or N,N-dialkylcarbamoyl, the alkyl moiety or moieties containing 1 to 4 carbon atoms; sulfo; nitro; cyano; carboxy; phenoxy; $C_1$-$C_4$alkanoylamino, preferably acetylamino, propionylamino; benzoylamino; $C_1$-$C_4$alkoxycarbonyl, for example methoxycarbonyl or ethoxycarbonyl.

The radicals $D_1$ and $D_2$ are derived, for example, from the following amines:
anthranilic acid, 4- or 5-chloroanthranilic acid, 4- or 5-sulfoanthranilic acid, 2-amino-3-naphthoic acid, 2-amino-1-hydroxybenzene, 4-chloro- and 4,6-dichloro-2-amino-1-hydroxybenzene, 4- or 5-nitro-2-amino-1-hydroxybenzene, 4-chloro-, 4-methyl- and 4-acetyl-amino-6-nitro-2-amino-1-hydroxybenzene, 6-acetylamino- and 6-chloro-4-nitro-2-amino-1-hydroxybenzene, 4-cyano-2-amino-1-hydroxybenzene, 4-sulfonamido-2-amino-1-hydroxybenzene, 1-hydroxy-2-aminobenzene-4-sulfoanthranilide, 4-methoxy-2-amino-1-hydroxybenzene, 4-methoxy-5-chloro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 2-amino-1-hydroxybenzene-4- or -5-sulfonic acid, 4-nitro-2-amino-1-hydroxybenzene-6-sulfonic acid, 6-nitro-2-amino-1-hydroxybenzene-4-sulfonic acid, 4-chloro-2-amino-1-hydroxybenzene-6-sulfonic acid, 1-amino-2-hydroxynaphthalene-4-sulfonic acid, 1-amino-2-hydroxy-6-nitronaphthalene-4-sulfonic acid, 1-amino-2-hydroxy-6-chloronaphthalene-4-sulfonic acid, 1-amino-2-hydroxynaphthalene-4,6-disulfonic acid, 2-amino-1-hydroxybenzene-4,6-disulfonic acid.

Instead of the above hydroxylated amines, suitable contenders for $D_1$ and $D_2$ are also corresponding methoxy compounds or corresponding compounds whose hydroxyl group has been tosylated, for example anisidine, 4- or 5-chloroanisidine, 4- or 5-nitroanisidine, anisidine-4- or 5-sulfonic acid, or tosylated 1-hydroxy-2-amino-benzene, the methoxy or O-tosyl group of which is converted into an —OH group before or during metallising. Compounds containing these groups are used in particular whenever the corresponding 1-hydroxy-2-amino compounds couple reluctantly.

In preferred dyes of formula (1), each of $D_1$ and $D_2$ independently of the other is the radical of a 1-hydroxy-2-aminobenzene which may be further substituted by chloro, nitro, sulfo, methyl, methoxy, methylsulfonyl, carbamoyl and/or sulfamoyl. Accordingly, p and q are each preferably 0.

A phenyl radical Q may be unsubstituted phenyl or phenyl which is substituted, for example, by $C_1$-$C_4$alkyl, $C_1$-$C_4$alkoxy, halogen, nitro, cyano, $C_1$-$C_4$alkoxycarbonyl, $C_1$-$C_4$-alkylsulfonyl, sulfo or trihalomethyl. The phenyl radical is preferably unsubstituted or is substituted by methyl, isopropyl, methoxy, sulfo, nitro, chloro, bromo or trifluoromethyl. Most preferably, Q is an unsubstituted phenyl radical.

A naphthyl radical Q is, for example, an unsubstituted 1- or 2-naphthyl radical.

Q as an aromatic-heterocyclic radical may typically be a furanyl, thienyl, thiazolyl, oxazolyl, isothiazolyl, benzthiazolyl, benzisothiazolyl, pyrazolyl, imidazolyl, 1,2,3-triazolyl, 1,2,4-triazolyl, 1,2,4-thiadiazolyl, 1,3,4-thiadiazolyl or 1,3,5-triazine radical. These radicals may be unsubstituted or substituted, for example, by $C_1$-$C_-$ 4alkyl, nitro, cyano, C$_1$-C$_4$alkoxycarbonyl or C$_1$-C$_4$alkylthio.

An aromatic-heterocyclic radical Q is preferably an unsubstituted furanyl, thienyl or benzthiazolyl radical.

Compounds of formula (1), wherein Q is the phenyl radical, constitute a particularly preferred embodiment of the dyes of this invention.

An unsubstituted or substituted C$_1$-C$_6$alkyl radical R$_1$ and/or R$_2$ is, for example, a methyl, ethyl, n-propyl or isopropyl, n-, iso-, sec- or tert-butyl radical or a straight-chain or branched pentyl or hexyl radical, which radicals may be substituted, for example, by hydroxy, sulfo, sulfato, carboxy, cyano, halogen, C$_1$-C$_4$alkoxycarbonyl, C$_1$-C$_4$alkanoyloxy or carbamoyl, and the alkyl moiety, with the exception of methyl, may additionally be interrupted in the chain by, for example, a group —O—.

Examples of substituted alkyl radicals R$_1$ and R$_2$ are: sulfomethyl, carboxymethyl, β-hydroxyethyl, β-sulfoethyl, β-sulfatoethyl, β-cyanoethyl, β-carboxyethyl, γ-hydroxypropyl, γ-sulfatopropyl, β-hydroxy-n-butyl, β-(β-hydroxyethoxy)ethyl, β-(β-sulfatoethoxy)ethyl.

R$_1$ and R$_2$ as alkyl are preferably each independently of the other unsubstituted C$_1$-C$_4$alkyl.

A phenyl radical R$_1$ and/or R$_2$ may be unsubstituted or substituted, for example, by sulfo, carboxy, C$_1$-C$_4$alkyl, C$_1$-C$_4$alkoxy or halogen.

R$_1$ is preferably unsubstituted C$_1$-C$_4$alkyl and is, in particular, ethyl, n-propyl or isopropyl. R$_2$ is most preferably hydrogen.

A preferred embodiment of the present invention relates to compounds of formula (1), wherein Q is phenyl, R$_1$ is C$_1$-C$_4$alkyl and R$_2$ is hydrogen. The coupling component from which the radical K is derived is, for example, an unsubstituted phenol or a phenol which is substituted, for example, by C$_1$-C$_5$alkyl, C$_1$-C$_4$alkoxy, N,N-dialkylamino containing 1 to 4 carbon atoms in each of the alkyl moieties, C$_1$-C$_4$alkoxycarbonylamino or C$_1$-C$_4$alkanoylamino; an unsubstituted 1- or 2-naphthol or a 1- or 2-naphthol which is substituted, for example, by C$_1$-C$_4$alkyl, C$_1$-C$_4$alkoxy, chloro, amino, C$_1$-C$_4$alkanoylamino, benzoylamino and/or sulfo; a 5-pyrazolone which carries in 1-position an unsubstituted phenyl or naphthyl radical or a phenyl or naphthyl radical which is substituted, for example, by chloro, nitro, sulfo, C$_1$-C$_4$alkyl and/or C$_1$-C$_4$alkoxy; a 6-hydroxy-3-cyano- or 6-hydroxy-3-carbamoyl-2-pyridone which is substituted in 1-position by unsubstituted or substituted C$_1$-C$_4$alkyl, for example methyl, isopropyl, β-hydroxyethyl, β-aminoethyl or γ-isopropoxypropyl or by phenyl, and in 4-position may carry a C$_1$-C$_4$alkyl group, preferably methyl; an acetoacetamide, preferably an acetoacetanilide or benzoylacetanilide, each of which may be substituted in the anilide nucleus by chloro, nitro, C$_1$-C$_4$alkyl, C$_1$-C$_4$alkoxy or sulfo; a 1- or 2-naphthylamine which is unsubstituted or substituted by sulfo, sulfamoyl, or N-mono- or N,N-dialkylsulfamoyl which contains 1 to 4 carbon atoms in the alkyl moiety or moieties; or is a compound of formula

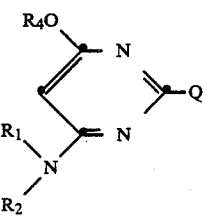

(2)

wherein R$_1$, R$_2$ and Q have the meanings and preferred meanings assigned to them above, and R$_4$ is C$_1$-C$_4$alkyl or, preferably, hydrogen.

The radical K is preferably derived from an unsubstituted or a sulfo- and/or amino-substituted 1- or 2-naphthol, a 1-phenyl-3-methyl-5-pyrazolone or acetoacetanilide, the phenyl moiety of each of which last two mentioned compounds is unsubstituted or substituted, for example, by C$_1$-C$_4$alkyl, C$_1$-C$_4$alkoxy, chloro, nitro and/or sulfo, or from a compound of the formula (2) above.

Examples of especially preferred coupling components from which the radical K may be derived are: 1-naphthol, 2-naphthol, 1-phenyl-3-methyl-5-pyrazolone, 1-(o-, m- or p-sulfophenyl)-3-methyl-5-pyrazolone or 4-ethylamino-, 4-n-propylamino- or 4-isopropylamino-6-hydroxy-2-phenylpyrimidine.

X is preferably —O—.

The metal complex compounds of formula (1) carry, for example, 0 to 4, preferably 1 to 3 and, most preferably, 1 or 2, sulfo groups, the term "sulfo" comprising the free acid form (—SO$_3$H) as well as the salt form.

The metal complex compounds of formula (1) are conveniently isolated in the form of their salts, preferably alkali metal salts such as lithium, potassium and, most preferably sodium salts or also ammonium salts.

Of particular importance on account of their good tinctorial properties are the symmetrical 1:2 metal complex dyes which, in the form of the free acid, have the formula

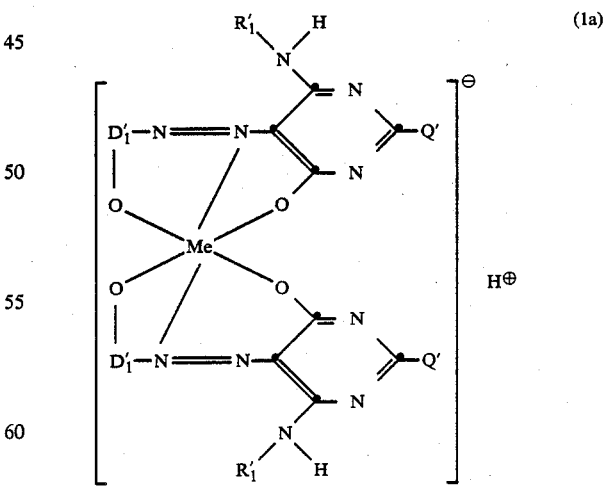

(1a)

and contain two sulfo groups, wherein

D$_1$' is the radical of a 1-amino-2-hydroxybenzene which is unsubstituted or substituted by chloro, nitro, sulfo, methyl, methoxy, methylsulfonyl, carbamoyl and/or sulfamoyl, Q' is unsubstituted phenyl or phenyl which is substituted by methyl, isopropyl, methoxy, sulfo, nitro, chloro, bromo or trifluoromethyl, $R_1'$ is $C_1$-$C_4$alkyl, and Me is cobalt or chromium.

A further preferred embodiment of the present invention relates to asymmetrical 1:2 chromium complex dyes which, in the form of the free acid, have the formula

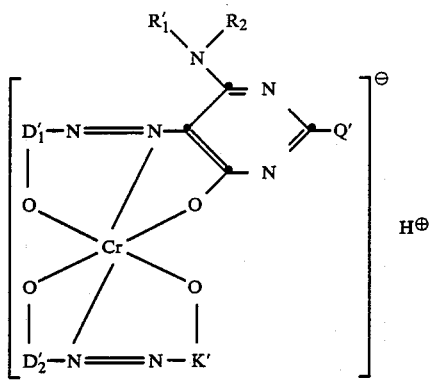

(1b)

and contain 1 to 3 sulfo groups, wherein $D_1'$, $Q_1'$ and $R_1'$ are each as previously defined, $D_2'$ independently has the meaning of $D_1'$ and $K'$ is the radical of an unsubstituted or sulfo- and/or amino-substituted 1- or 2-naphthol or is the radical of a 1-phenyl-3-methyl-5-pyrazolone or acetoacetanilide, the phenyl moiety of each of which last two mentioned compounds is unsubstituted or substituted by, for example, $C_1$-$C_4$alkyl, $C_1$-$C_4$alkoxy, chloro, nitro and/or sulfo.

The compounds of formula (1) can be prepared by methods which are known per se, for example by reacting an azo compound of formula

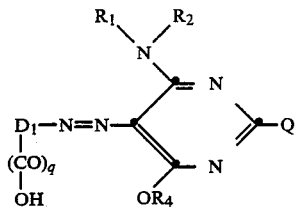

(3)

and an azo compound of formula

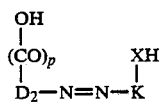

(4)

in which formulae (3) and (4) above $D_1$, $D_2$, K, Q, $R_1$, $R_2$, $R_4$, X, p and q are each as previously defined, which compounds of formulae (3) and (4) may be identical or different, with a cobalt or chromium donor to give the 1:2 metal complex.

If in the above process the compounds of formulae (3) and (4) are different, then mixtures of 1:2 metal complexes are formed which, in addition to symmetrical complexes containing two molecules of the compound of formula (3) or (4), also contain asymmetrical complexes containing one molecule of each of the compounds of formulae (3) and (4).

Examples of suitable cobalt or chromium donors are cobalt or chromium salts or complexes such as cobalt sulfate, cobalt acetate or cobalt chloride, chromium sulfate, chromium acetate, chromium chloride, chromium formate or chromium salicylate and the like.

It is convenient to use an excess of the metal donor, based on the compounds of formulae (3) and (4), which excess may be, for example, 1 to 8 mol, preferably 1 to 5 mol, per mol of the sum of the compounds of formulae (3) and (4).

The metallising takes place, for example, in aqueous medium in the temperature range from 10° to 100° C., preferably from 20° to 60° C. and in a pH range from 3 to 12, or in a polar aprotic medium, for example in formamide, in the temperature range from, for example, 50° to 150° C.

The 1:2 chromium complexes of formula (1) may also be obtained by preparing the 1:1 chromium complex of a compound of formula (3) or, preferably, of a compound of formula (4), and then reacting said 1:1 complex with a non-metallised compound of formula (4) or, preferably, of formula (3), to give homogeneous asymmetrical 1:2 chromium complex dyes.

The preparation of the 1:1 chromium complex is carried out by methods which are known per se by treating the one azo compound, preferably in acid solution, with a chromium(III) salt. The 1:1 chromium complex of this azo compound is subsequently reacted, in weakly acid, neutral or weakly alkaline medium, with the second non-metallised azo compound.

The compounds of formula (4), with the exception of the compounds wherein K is a radical of the formula (2) above, are known or can be obtained in a manner known per se.

The compounds of formula (3) are novel and constitute a further object of the invention. They can be obtained in a manner known per se, for example by diazotising a diazo component of formula

and coupling the diazonium salt to a compound of formula

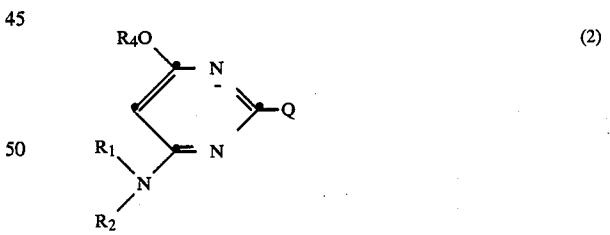

(2)

in which formulae above $D_1$, $R_1$, $R_2$, $R_4$, Q and q are each as defined previously.

The diazotisation of the amine of formula (5) and the coupling to a compound of formula (2) are carried out in a manner known per se in aqueous or aqueous-organic medium, preferably at low temperature, for example in the range from −5° to +30° C. The coupling can take place in acid, neutral or alkaline medium, preferably in acid medium.

The compounds of formula (5) are known per se or can be obtained in known manner.

Some of the compounds of formula (2) are novel. Hence the present invention also relates to compounds of formula (2), wherein $R_2$ and Q have the meanings and preferred meanings previously assigned to them, $R_1$ is unsubstituted or substituted $C_2$–$C_6$alkyl or unsubstituted or substituted phenyl, and $R_4$ is hydrogen or $C_1$–$C_4$alkyl. The compounds of formula (2) can be prepared, for example, by reacting a compound of formula

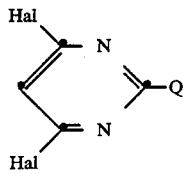 (6)

with an amine formula

 (7)

to the compound of formula

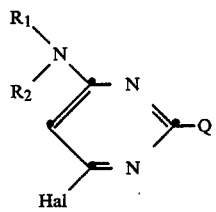 (8)

then reacting said compound of formula (8) with a compound of formula

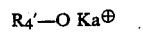 (9)

to give the compound of formula (2), wherein $R_4$ is $C_1$–$C_4$alkyl, and converting said compound of formula (2) in an optional additional step by saponification in alkaline medium into the compound of formula (2), wherein $R_4$ is hydrogen, in which formulae (6), (7), (8) and (9) above Q, $R_1$ and $R_2$ have the meanings previously assigned to them, Hal is halogen, preferably chloro, $R_4'$ is $C_1$–$C_4$alkyl, and $Ka^{\oplus}$ is a cation, for example a lithium, sodium, potassium or ammonium cation.

The compounds of formula (6) are disclosed, for example, in European patent application 0 055 693 or 0 096 657, or can be prepared by methods analogous to those described therein.

The reaction of the compounds (6) and (7) is preferably carried out in a polar solvent. Examples of suitable solvents are $C_1$–$C_4$alkanols such as methanol or ethanol, glycols and glycol ethers such as ethylene glycol or ethylene glycol monomethyl or dimethyl ether, formamides such as N,N-dimethylformamide or water. Mixtures of several solvents may also be suitably used. The reaction temperature is in the range from about 20° to 150° C. and is preferably from 30° to 100° C.

The components of formulae (6) and (7) can be used in stoichiometric proportion. However, it is often more expedient to use an excess of component (7).

The further reaction of the compounds of formula (8) with the alcoholate of formula (9) is preferably carried out in one of the above mentioned solvents in the temperature range from, for example, 60° to 120° C. The components (8) and (9) can be used in stoichiometric amounts, but it is preferred to use an excess of alcoholate of formula (9).

The saponification of the alkoxy compound of formula (2) to the hydroxy compound of formula (2) takes place in a manner known per se, for example in the presence of one of the above mentioned solvents and of a strong base, for example an alkali metal hydroxide such as sodium or potassium hydroxide, at elevated temperature, for example in the range from 80° to 200° C. and, preferably, from 100° to 1180° C.

The compounds of formula (1) are anionic dyes and are generally suitable for dyeing textile and non-textile substrates which are dyeable with anionic dyes, for example for dyeing fiber material of natural or regenerated cellulose, natural or synthetic polyamides, polyurethanes or basically modified polyolefins, and also for dyeing anodised aluminium or leather and pelts.

The dyes of this invention may be used with advantage for dyeing, for example, cellulosic nonwovens, wood and paper. Suitable fiber materials are in particular cotton and natural polyamides such as wool and silk, whereas preferred synthetic fiber materials are polyamides (for example polyamide 66) and basically modified polypropylenes.

The compounds of formula (1) are preferably suitable for dyeing pelts and, in particular, leather, all types of leather being suitable, for example chrome leather, retanned leather or suede leather obtained from goatskin, sheepskin, cowhide or pigskin.

The dyeings obtained have good allround fastness properties such as fastness to diffusion, light, acid and alkali. The dyes of formula (1) have good fiber affinity, good stability to acid and alkali and good electrolyte resistance. The good build-up on different types of leather such as pure chrome leather and retanned leather merits special mention.

The compounds of formula (1) are also suitable for use as components of inks and, in particular, of marker fluids for the ink-jet method.

The following non-limitative Examples will serve to illustrate the invention. Parts and percentages are by weight.

PREPARATION OF THE PYRIMIDINE COUPLING COMPONENTS

EXAMPLE 1

71 g of ethylamine as 70% aqueous solution are passed at 25°–30° C. into a solution of 115.1 g of 4,6-dichloro-2-phenylpyrimidine in 350 ml of dimethylformamide (DMF) over 45 minutes. After stirring for 30 minutes, the reaction solution is heated to 50°–55° C. and then further stirred for 1 hour at this temperature. The solution is then poured into ice-water and the precipitated product is extracted with methylene chloride. The combined methylene chloride extracts are dried over sodium sulfate and then evaporated to dryness, affording 112 g of the compound of formula

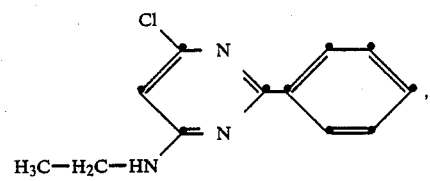

with a melting point of 67°–68° C.

EXAMPLE 2

117 g of 4-ethylamino-6-chloro-2-phenylpyrimidine according to Example 1 are dissolved in 350 ml of DMF and the solution is heated to 60°–65° C. Then 103.4 g of a 30% solution of sodium methylate are passed into this solution over 40 minutes and the reaction mixture is subsequently heated to 90°–95° C. and stirred for 2 hours at this temperature. The reaction solution is cooled to 40° C. and then poured into ice-water and worked up as in Example 1, affording 125 g of the compound of formula

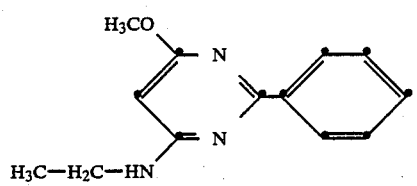

in the form of a faintly coloured oil which crystallises on standing. The crystallised product has a melting point of 51° C.

EXAMPLE 3

103 g of 4-ethylamino-6-methoxy-2-phenylpyrimidine according to Example 2 are added to 350 ml of ethylene glycol and then, with stirring, 31.5 g of 88% potassium hydroxide are added. The reaction mixture is heated to 160°–165° C. and stirred at this temperature for ca. 20 hours. Then ca. 250 ml of ethylene glycol are removed by distillation and the residue is diluted with 700 ml of water and heated to 70° C. The turbid solution is clarified by boiling with activated carbon, filtered, and the filtrate is acidified with hydrochloric acid. The colourless precipitate is isolated by filtration, washed with water and dried under vacuum, affording 78.5 g of the compound of formula

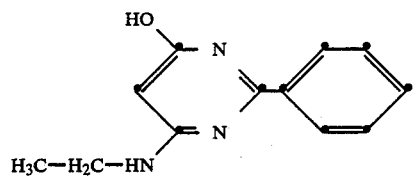

which melts at 199°–200° C.

EXAMPLES 4-5

The procedure described in Examples 1 to 3 is repeated, of ethylamine, to give the compounds of formulae

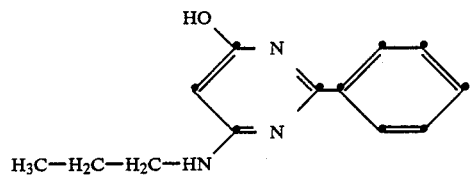

melting point: 143°–144° C.
and

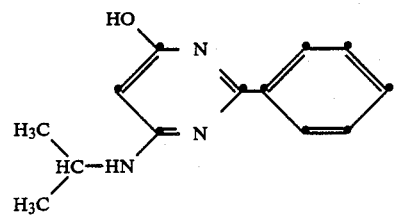

melting point: 165°–166° C.
in comparable yield.

EXAMPLE 5a–5f

In accordance with the procedures described in Examples 1 to 5, it is possible to prepare the following compounds:

| Example | Compound |
|---|---|
| 5a | HO-pyrimidine-N(HN-CH2-CH3), phenyl-CH3 |
| 5b | HO-pyrimidine-N(HN-CH2-CH3), phenyl-C(CH3)3 |
| 5c | HO-pyrimidine-N(HN-CH2-CH3), phenyl-Br |
| 5d | HO-pyrimidine-N(HN-CH2-CH3), furyl-O |
| 5e | HO-pyrimidine-N(HN-CH2-CH3), naphthyl |
| 5f | HO-pyrimidine-N(HN-CH3), phenyl |

PREPARATION OF THE AZO DYES

EXAMPLE 6

58.5 parts of 2-amino-4-nitrophenol-6-sulfonic acid are added to 400 parts of water and diazotisation is carried out in conventional manner with hydrochloric acid and sodium nitrite. 53 parts of 4-ethylamino-6-hydroxy-2-phenylpyrimidine according to Example 3 are dissolved in 30 ml of DMF and this solution is added dropwise at 0°–5° C. and pH 1.0 to the above solution of the diazonium compound. After stirring for 1 hour at 20°–25° C., the pH is adjusted to 7.8 with 30% sodium hydroxide solution and stirring is continued for ca. 14 hours at room temperature. The product is then isolated by filtration, washed with water and dried, to give the monoazo dye of formula

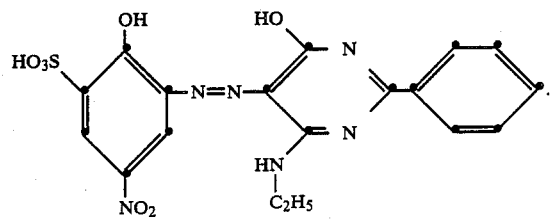

EXAMPLES 7–11g

The procedure of Example 6 is repeated, using equivalent amounts of the diazo and coupling components listed in Table 1 in place of 2-amino-4-nitrophenol-6-sulfonic acid and 4-ethylamino-6-hydroxy-2-(phenylpyrimidine, to give analogous monoazo dyes:

TABLE 1

| Example | Diazo component | Coupling component |
|---|---|---|
| 7 | 2-nitro-4-amino-phenol-SO₃H | 4-ethylamino-6-hydroxy-2-phenylpyrimidine |
| 8 | 2-nitro-4-amino-phenol-SO₃H | 4-isopropylamino-6-hydroxy-2-phenylpyrimidine |
| 9 | 2-nitro-4-amino-phenol-SO₃H | 4-propylamino-6-hydroxy-2-phenylpyrimidine |
| 10 | 4-amino-phenol-SO₂NH₂ | 4-propylamino-6-hydroxy-2-phenylpyrimidine |
| 11 | 2-sulfo-4-amino-6-chloro-phenol | 4-isopropylamino-6-hydroxy-2-phenylpyrimidine |

TABLE 1-continued

| Example | Diazo component | Coupling component |
|---|---|---|
| 11a | 2-aminobenzoic acid (COOH, NH$_2$ on benzene) | pyrimidine with HO, N, N, H$_3$C—HN, phenyl substituent |
| 11b | 2-amino-4-chlorophenol (OH, NH$_2$, Cl on benzene) | pyrimidine with HO, N, N, H$_3$C—HN, phenyl substituent |
| 11c | 2-amino-3-nitro-4-hydroxy-benzenesulfonic acid (O$_2$N, OH, NH$_2$, SO$_3$H) | pyrimidine with HO, N, N, H$_3$C—H$_2$C—HN, 3,4-dimethyl (CH$_3$, CH$_3$, CH$_3$) phenyl substituent |
| 11d | 2-amino-3-nitro-4-hydroxy-benzenesulfonic acid (O$_2$N, OH, NH$_2$, SO$_3$H) | pyrimidine with HO, N, N, H$_3$C—H$_2$C—HN, 4-bromophenyl substituent |
| 11e | 2-amino-3-nitro-4-hydroxy-benzenesulfonic acid (O$_2$N, OH, NH$_2$, SO$_3$H) | pyrimidine with HO, N, N, HN—CH$_2$—CH$_3$, naphthyl substituent |
| 11f | 2-aminophenol-4-sulfonamide (OH, NH$_2$, SO$_2$NH$_2$) | pyrimidine with HO, N, N, HN—CH$_2$—CH$_3$, furyl (O) substituent |
| 11g | 2-aminophenol-4-sulfonamide (OH, NH$_2$, SO$_2$NH$_2$) | pyrimidine with HO, N, N, HN—CH$_2$—CH$_3$, 4-methylphenyl (CH$_3$) substituent |

PREPARATION OF THE COMPLEX DYES

EXAMPLE 12

46 parts of the monoazo dye obtained according to Example 7 are suspended in 500 parts of formamide and a 1 molar solution of cobalt sulfate (corresponding to 3 parts of cobalt) are added. The reaction mixture is heated to 105°–110° C. and stirred for ca. 9 hours at this temperature. The dye is then salted out by addition of sodium chloride, isolated by filtration, washed and dried, to give red crystals of the 1:2 cobalt complex of the monoazo dye of formula

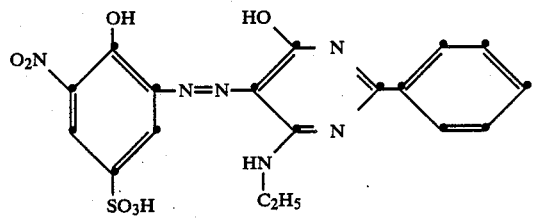

which dyes leather in a red shade of good allround fastness properties.

EXAMPLE 13

46 parts of the monoazo dye obtained according to claim 7 are suspended in 450 parts of formamide. After addition of chromosalicylic acid (corresponding to 2.6 parts of chromium), the reaction mixture is heated to 105°–110° C. and stirred for ca. 2 hours at this temperature. The dye is then salted out with sodium chloride, isolated by filtration, washed and dried, to give red crystals of the 1:2 chromium complex of the dye of formula

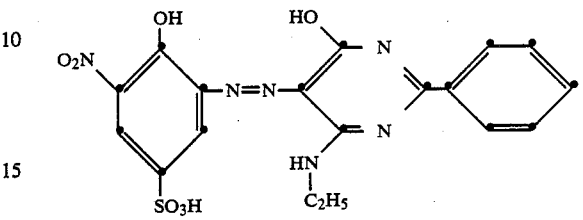

which dyes leather in a violet shade of good allround fastness properties.

EXAMPLES 14–20f

The procedure described in either Example 12 or 13 is repeated, replacing the monoazo dyes used therein by those listed in Table 2, to give analogous metal complex dyes which dye leather in the indicated shades:

TABLE 2

| Example | Monoazo dye | Metal | Shade on leather |
|---|---|---|---|
| 14 | (structure) | Co | red |
| 15 | (structure) | Cr | claret |
| 16 | (structure) | Co | red |

TABLE 2-continued

| Example | Monoazo dye | Metal | Shade on leather |
|---|---|---|---|
| 17 | 3-O$_2$N, 2-OH, 5-SO$_3$H phenyl–N=N–C(OH)=C(NH–CH(CH$_3$)$_2$)–... isopropenyl-phenyl pyrazine | Cr | violet |
| 18 | 2-OH, 3-SO$_3$H, 5-NO$_2$ phenyl–N=N–C(OH)=C(NH–C$_2$H$_5$)–... isopropenyl-phenyl pyrazine | Co | red |
| 19 | 2-OH, 5-SO$_2$NH$_2$ phenyl–N=N–C(OH)=C(NH–CH$_2$CH$_2$CH$_3$)–... isopropenyl-phenyl pyrazine | Co | red |
| 20 | 2-OH, 5-SO$_2$NH$_2$ phenyl–N=N–C(OH)=C(NH–CH$_2$CH$_2$CH$_3$)–... isopropenyl-phenyl pyrazine | Cr | ruby |
| 20a | 2-OH, 4-Cl phenyl–N=N–C(OH)=C(NH–CH$_3$)–... isopropenyl-phenyl pyrazine | Co | violet |
| 20b | 3-O$_2$N, 2-OH, 5-SO$_3$H phenyl–N=N–C(OH)=C(NH–CH$_2$CH$_3$)–... 4-isopropyl-phenyl pyrazine | Co | red |
| 20c | 3-O$_2$N, 2-OH, 5-SO$_3$H phenyl–N=N–C(OH)=C(NH–CH$_2$CH$_3$)–... 4-Br-isopropenyl-phenyl pyrazine | Co | red |

TABLE 2-continued

| Example | Monoazo dye | Metal | Shade on leather |
|---|---|---|---|
| 20d | (structure) | Cr | claret |
| 20e | (structure) | Co | red |
| 20f | (structure) | Cr | claret |

EXAMPLE 21

26 parts of the complex chromium compound of the type 1 atom of chromium: 1 molecule of monoazo dye of formula

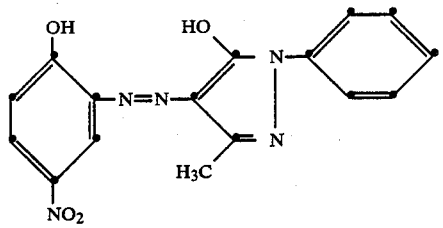

prepared in a manner which is known per se, are dissolved warm in 340 parts of formamide. To this solution are added at 80°–85° C. 23 parts of the monoazo dye prepared according to Example 7, and the mixture is stirred for 2 hours at this temperature. The product is then salted out in known manner, isolated by filtration, washed and dried, to give red crystals of the dye of formula

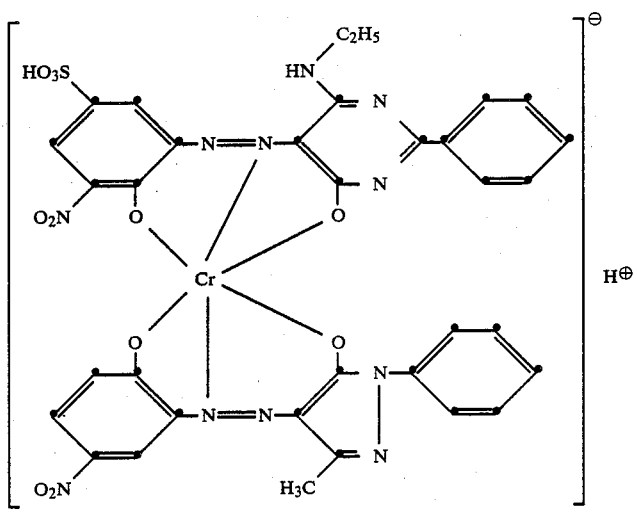

in form of the free acid which dyes leather in a red shade of good allround fastness properties.

EXAMPLES 22-28

The procedure of Example 21 is repeated, using in each case an equivalent amount of the 1:1 chromium complex of the monoazo dye 1 listed in Table 3 with the monoazo dye 2, to give analogous 1:2 chromium complex dyes which dye leather in the indicated shades:

TABLE 3

| Example | Monoazo dye 1 | Monoazo dye 2 | Shade on leather |
|---|---|---|---|
| 22 | [structure] | [structure] | corinth |
| 23 | [structure] | [structure] | ruby |
| 24 | [structure] | [structure] | ruby |
| 25 | [structure] | [structure] | navy |
| 26 | [structure] | [structure] | brown |
| 27 | [structure] | [structure] | red |

TABLE 3-continued

| Example | Monoazo dye 1 | Monoazo dye 2 | Shade on leather |
|---|---|---|---|
| 28 | | | corinth |

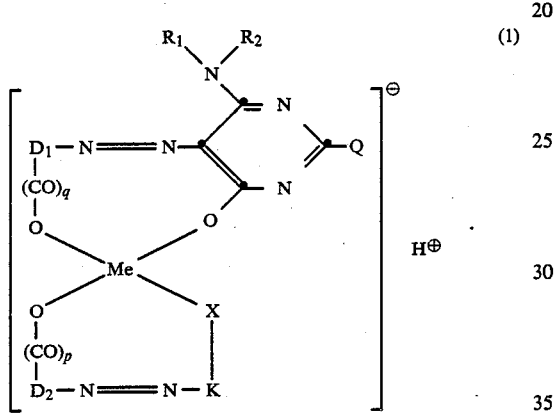

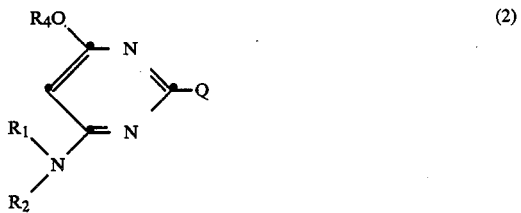

What is claimed is:

1. A metal complex compound which, in the form of the free acid, has the formula $$(1)$$

wherein
- $D_1$ and $D_2$ are each independently of the other a phenyl or 1- or 2-naphthyl radical, which carries a hydroxy or carboxy group in ortho-position to the azo group and which is unsubstituted or substituted by $C_1$-$C_4$alkyl, $C_1$-$C_4$alkoxy, halogen, trifluoromethyl, $C_1$-$C_4$alkylsulfonyl, sulfamoyl, N-mono- or N,N-dialkylsulfamoyl, the alkyl moiety or moieties containing 1 to 4 carbon atoms, carbamoyl, N-mono- or N,N-dialkylcarbamoyl, the alkyl moiety or moieties or moieties containing 1 to 4 carbon atoms, sulfo, nitro, cyano, carboxy, phenoxy, $C_1$-$C_4$alkanoylamino, benzoylamino or $C_1$-$C_4$alkoxycarbonyl,
- K is the radical of an unsubstituted phenol or of a phenol which is substituted by $C_1$-$C_5$alkyl, $C_1$-$C_4$alkoxy, N,N-dialkylamino containing 1 to 4 carbon atoms in each of the alkyl moieties, $C_1$-$C_4$alkoxycarbonylamino or $C_1$-$C_4$alkanoylamino; of an unsubstituted 1- or 2-naphthyl or of a 1- or 2-naphthol which is substituted by $C_1$-$C_4$alkyl, $C_1$-$C_4$alkoxy, chloro, amino, $C_1$-$C_4$alkanoylamino, benzoylamino or sulfo; of a 5-pyrazolone which carries in 1-position an unsubstituted phenyl or naphthyl radical or a phenyl or naphthyl radical which is substituted by chloro, nitro, sulfo, $C_1$-$C_4$alkyl or $C_1$-$C_4$alkoxy; of a 6-hydroxy-3-cyano-or 6-hydroxy-3-carbamoyl-2-pyridone which in 1-position is substituted by $C_1$-$C_4$alkyl, β-hydroxyethyl, β-aminoethyl, γ-isopropoxypropyl or phenyl and in 4-position is unsubstituted or substituted by $C_1$-$C_4$alkyl; of an acetoacetanilide or benzoylacetanilide, each of which is unsubstituted or is substituted in the anilide nucleus by chloro, nitro, $C_1$-$C_4$alkyl, $C_1$-$C_4$alkoxy or sulfo; of a 1- or 2-naphthylamine which is unsubstituted or substituted by sulfo, sulfamoyl, or N-mono- or N,N-dialkylsulfamoyl which contains 1 to 4 carbon atoms in the alkyl moiety or moieties; or is the radical of a compound of formula $$(2)$$

and wherein K carries the group X in ortho-position to the azo group,
- Me is chromium or cobalt,
- Q is phenyl or phenyl which is substituted by $C_1$-$C_4$alkyl, $C_1$-$C_4$alkoxy, halogen, nitro, cyano, $C_1$-$C_4$alkoxycarbonyl, $C_1$-$C_4$alkylsulfonyl, sulfo or trihalomethyl, or is 1- or 2-naphthyl or unsubstituted or $C_1$-$C_4$alkyl-, nitro-, cyano-, $C_1$-$C_4$alkoxycarbonyl- or $C_1$-$C_4$alkylthio-substituted furanyl, thienyl, thiazolyl, oxazolyl, isothiazolyl, benzthiazolyl, benzisothiazolyl, pyrazolyl, imidazolyl, 1,2,3-triazolyl, 1,2,4-triazolyl, 1,2,4-thiadiazolyl, 1,3,4-thiadiazolyl or 1,3,5-triazinyl, $R_1$ is $C_1$-$C_6$alkyl unsubstituted or substituted by hydroxy, sulfo, sulfato, carboxy, cyano, halogen, $C_1$-$C_4$alkoxycarbonyl, $C_1$-$C_4$alkanoyloxy or carbamoyl, and uninterrupted or with the exception of methyl interrupted by a group —O—, or is phenyl or phenyl which is substituted by sulfo, carboxy, $C_1$-$C_4$alkyl, $C_1$-$C_4$alkoxy or halogen, $R_2$ independently has the meaning of $R_1$ or is hydrogen,
- X is —O— or —NR$_3$,
- $R_3$ is hydrogen or $C_1$-$C_4$alkyl,
- $R_4$ is hydrogen or $C_1$-$C_4$alkyl and
- p and q are each independently of the other 0 or 1.

2. A metal complex compound according to claim 1 which contains 1 to 3 sulfo groups.

3. A metal complex compound according to claim 1, wherein $D_1$ and $D_2$ are each independently of the other phenyl or phenyl which is substituted by chloro, nitro, sulfo, methyl, methoxy, methylsulfonyl, carbamoyl or sulfamoyl.

4. A metal compound according to claim 1, wherein p and q are each 0.

5. A metal complex compound according to claim 1, wherein Q is phenyl or phenyl which is substituted by $C_1$-$C_4$alkyl, $C_1$-$C_4$alkoxy, halogen, nitro, cyano, $C_1$-$C_4$alkoxycarbonyl, $C_1$-$C_4$-alkylsulfonyl, sulfo or trihalomethyl, or is 1- or 2-naphthyl or furanyl, thienyl or benzthiazolyl.

6. A metal complex compound according to claim 1, wherein Q is phenyl or phenyl which is substituted by methyl, isopropyl, methoxy, sulfo, nitro, chloro, bromo or trifluoromethyl.

7. A metal complex compound according to claim 1, wherein Q is phenyl.

8. A metal complex compound according to claim 1, wherein $R_1$ is $C_1$-$C_6$alkyl or $C_1$-$C_6$alkyl which is substituted by hydroxy, sulfo, sulfato, carboxy, cyano, halogen, $C_1$-$C_4$alkoxycarbonyl, $C_1$-$C_4$alkanoyloxy or carbamoyl, or is phenyl or phenyl which is substituted by sulfo, carboxy, $C_1$-$C_4$alkyl, $C_1$-$C_4$alkoxy or halogen, and $R_2$ independently has the meaning of $R_1$ or is hydrogen.

9. A metal complex compound according to claim 1, wherein $R_1$ is $C_1$-$C_4$alkyl and $R_2$ is hydrogen.

10. A metal complex according to claim 1, wherein Q is phenyl, $R_1$ is $C_1$-$C_4$alkyl and $R_2$ is hydrogen.

11. A metal complex compound according to claim 1, wherein K is the radical of an unsubstituted or a sulfo- or amino-substituted 1- or 2-naphthol, of a 1-phenyl-3-methyl-5-pyrazolone or acetoacetanilide, the phenyl moiety of each of which last two mentioned compounds is unsubstituted or substituted by $C_1$-$C_4$alkyl, $C_1$-$C_4$alkoxy, chloro, nitro or sulfo, or of a compound of formula (2).

12. A metal complex according to claim 11, wherein K is the radical of 1-naphthol, 2-naphthol, 1-phenyl-3-methyl-5-pyrazolone, 1-(o-, m- or p-sulfophenyl)-3-methyl-5-pyrazolone or is the radical of 4-ethylamino-, 4-n-propylamino- or 4-isopropylamino-6-hydroxy-2-phenylpyrimidine.

13. A metal complex compound according to claim 1, wherein X is —O—.

14. A metal complex compound according to claim 1 which, in the form of the free acid, has the formula

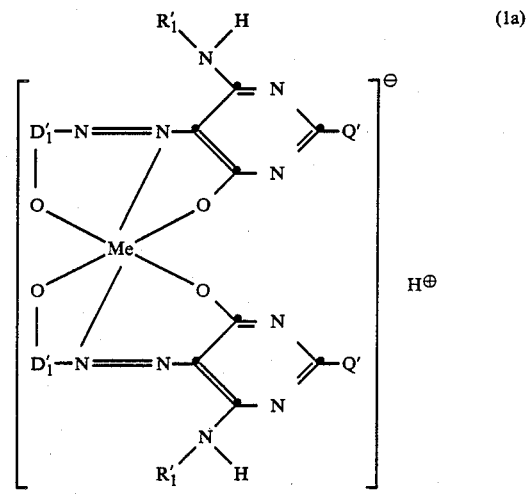

and contains two sulfo groups, wherein
$D_1'$ is the radical of a 1-amino-2-hydroxybenzene which is unsubstituted or substituted by chloro, nitro, sulfo, methyl, methoxy, methylsulfonyl, carbamoyl or sulfamoyl,
Q' is phenyl or phenyl which is substituted by methyl, isopropyl, methoxy, sulfo, nitro, chloro, bromo or trifluoromethyl,
$R_1'$ is $C_1$-$C_4$alkyl, and
Me is cobalt or chromium.

15. A metal complex compound according to claim 1, which in the form of the free acid, has the formula

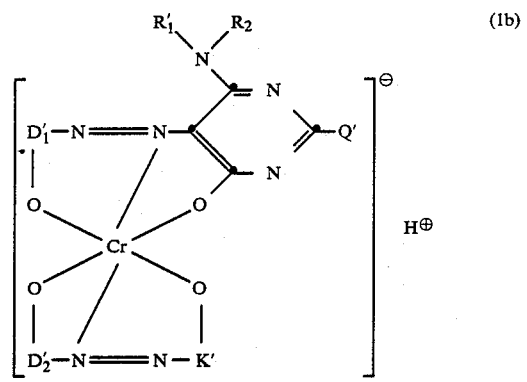

and contains 1 to 3 sulfo groups, wherein $D_1$, is the radical of a 1-amino-2-hydroxybenzene which is unsubstituted or substituted by chloro, nitro, sulfo, methyl, methoxy, methylsulfonyl, carbamoyl or sulfamoyl,
Q' is phenyl or phenyl which is substituted by methyl, isopropyl, methoxy, sulfo, nitro, chloro, bromo or trifluoromethyl,
$R_1'$ is $C_1$-$C_4$alkyl, $D_2'$ independently has the meaning of $D_1'$ and K' is the radical of an unsubstituted or sulfo- or amino-substituted 1- or 2-naphthol or is the radical of a 1-phenyl-3-methyl-5-pyrazolone or acetoacetanilide, the phenyl moiety of each of which last two mentioned compounds is unsubstituted or substituted by $C_1$-$C_4$alkyl, $C_1$-$C_4$alkyl, $C_1$-$C_4$alkoxy, chloro, nitro or sulfo.

* * * * *